United States Patent
Litmanovich et al.

(10) Patent No.: US 9,426,777 B2
(45) Date of Patent: Aug. 23, 2016

(54) SYSTEM AND METHOD FOR FINE-RESOLUTION MAPPING OF CELLULAR NETWORK COVERAGE AND CAPACITY

(71) Applicant: Verint Systems Ltd., Herzliya Pituach (IL)

(72) Inventors: Gustavo Litmanovich, Herzliya Pituach (IL); Eithan Goldfarb, Ness Ziona (IL)

(73) Assignee: Verint Systems Ltd., Herzilya Pituach (IL)

( * ) Notice: Subject to any disclaimer, the term of this patent is extended or adjusted under 35 U.S.C. 154(b) by 0 days.

(21) Appl. No.: 14/604,263

(22) Filed: Jan. 23, 2015

(65) Prior Publication Data

US 2015/0215893 A1     Jul. 30, 2015

(30) Foreign Application Priority Data

Jan. 30, 2014  (IL) .......................................... 230744

(51) Int. Cl.
  *H04W 64/00*   (2009.01)
  *H04W 16/18*   (2009.01)
  *G01S 5/02*    (2010.01)

(52) U.S. Cl.
  CPC ........... *H04W 64/006* (2013.01); *G01S 5/0252* (2013.01); *H04W 16/18* (2013.01)

(58) Field of Classification Search
  CPC ............ H04W 64/006; H04W 64/003; H04W 72/048; H04W 36/08; H04W 24/02; G06F 21/6245; G01S 5/021

USPC ......... 455/456.1, 404.2, 452.1; 370/331, 338, 370/401; 713/150
  See application file for complete search history.

(56) References Cited

U.S. PATENT DOCUMENTS

2010/0304707 A1* 12/2010 Bolin ..................... G01S 5/021
                                                    455/404.2
2011/0219226 A1*  9/2011 Olsson ................ G06F 21/6245
                                                     713/150

FOREIGN PATENT DOCUMENTS

WO       2010116292       10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Phuoc H Doan
(74) *Attorney, Agent, or Firm* — Meunier Carlin & Curfman

(57) ABSTRACT

Systems and methods for fine-resolution mapping of cellular network coverage and capacity are described herein. An example method can include passively monitoring communication of multiple communication terminals in a cellular communication network, extracting from the monitored communication multiple data points and cell identifiers, and mapping an actual geographical coverage of at least a given cell of the cellular network based on the multiple data points. In particular, the multiple data points can comprise geographical positions that are measured and reported by the communication terminals while served by respective cells of the cellular communication network.

20 Claims, 2 Drawing Sheets

(56) References Cited

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

"Cell Scanning and Catcher Detection in unnoticeable pocket size," NetHawk C2, Data sheet, version 1.4, EXFO, 2010, 4 pages.

Girardin, F., et al., "Detecting air travel to survey passengers on a worldwide scale," Journal of Location Based Services, 2010, 26 pages.

Meyer, U., et al., "On the Impact of GSM Encryption and Man-in-the-Middle Attacks on the Security of Interoperating GSM/UMTS Networks," IEEE, 2004, 8 pages.

Vedaldi, A., "An implementation of SIFT detector and descriptor," University of California at Los Angeles, 2007, 7 pages.

* cited by examiner

SYSTEM AND METHOD FOR FINE-RESOLUTION MAPPING OF CELLULAR NETWORK COVERAGE AND CAPACITY

FIELD OF THE DISCLOSURE

The present disclosure relates generally to wireless communication, and particularly to methods and systems for mapping of cellular coverage and capacity.

BACKGROUND OF THE DISCLOSURE

A cellular communication network typically comprises multiple base stations that are distributed over a geographical area. Each base station operates one or more cells of the cellular network, such that each cell provides cellular communication services over certain coverage area.

SUMMARY OF THE DISCLOSURE

An embodiment that is described herein provides a method, including passively monitoring communication of multiple communication terminals that communicate in a cellular communication network. Multiple data points, which include geographical positions that are measured and reported by the communication terminals while served by respective cells of the cellular communication network, and corresponding cell identifiers of the cells, are extracted from the monitored communication. An actual geographical coverage of at least a given cell of the cellular communication network is mapped based on the multiple data points.

In some embodiments, passively monitoring the communication includes receiving the communication without affecting operation of the cellular communication network. In an embodiment, monitoring the communication includes extracting portions of the communication from multiple different interfaces of the cellular communication network, and correlating the portions of the communication using one or more common identifiers that identify the communication terminals.

In an embodiment, the geographical positions include coordinates measured in the communication terminals, and extracting the data points includes extracting the coordinates from application-layer information exchanged in the monitored communication. In another embodiment, mapping the actual geographical coverage includes estimating the actual geographical coverage for at least first and second different points in time.

In some embodiments, extracting the data points further includes assessing data bandwidth usage of the communication terminals, and mapping the actual geographical coverage includes mapping an actual data bandwidth usage for the given cell over the actual geographical coverage. Mapping the actual data bandwidth usage may include identifying data applications used by the communication terminals. Additionally or alternatively, mapping the actual data bandwidth usage may include estimating the actual bandwidth usage for at least first and second different points in time. In an embodiment, the method includes adaptively allocating bandwidth resources to the given cell based on the actual bandwidth usage.

In some embodiments, extracting the data points further includes extracting from the monitored traffic Network Measurement Reports (NMRs) in which the communication terminals report received signal strengths of one or more base stations of the cellular network, and mapping the actual geographical coverage includes correlating the extracted NMRs with the extracted geographical positions. In an embodiment, correlating the NMRs with the geographical positions includes generating a model that maps the received signal strengths as a function of location coordinates. The method may include assessing a quality-of-service of the cellular communication network based on the model. Alternatively, the method may include tracking one or more of the terminals based on the model.

There is additionally provided, in accordance with an embodiment that is described herein, a system including an interface and a processor. The interface is configured to passively monitor communication of multiple communication terminals that communicate in a cellular communication network. The processor is configured to extract from the monitored communication multiple data points, which include geographical positions that are measured and reported by the communication terminals while served by respective cells of the cellular communication network, and corresponding cell identifiers of the cells, and to map an actual geographical coverage of at least a given cell of the cellular communication network based on the multiple data points.

The present disclosure will be more fully understood from the following detailed description of the embodiments thereof, taken together with the drawings in which:

DETAILED DESCRIPTION OF EMBODIMENTS

Overview

Figure 1:
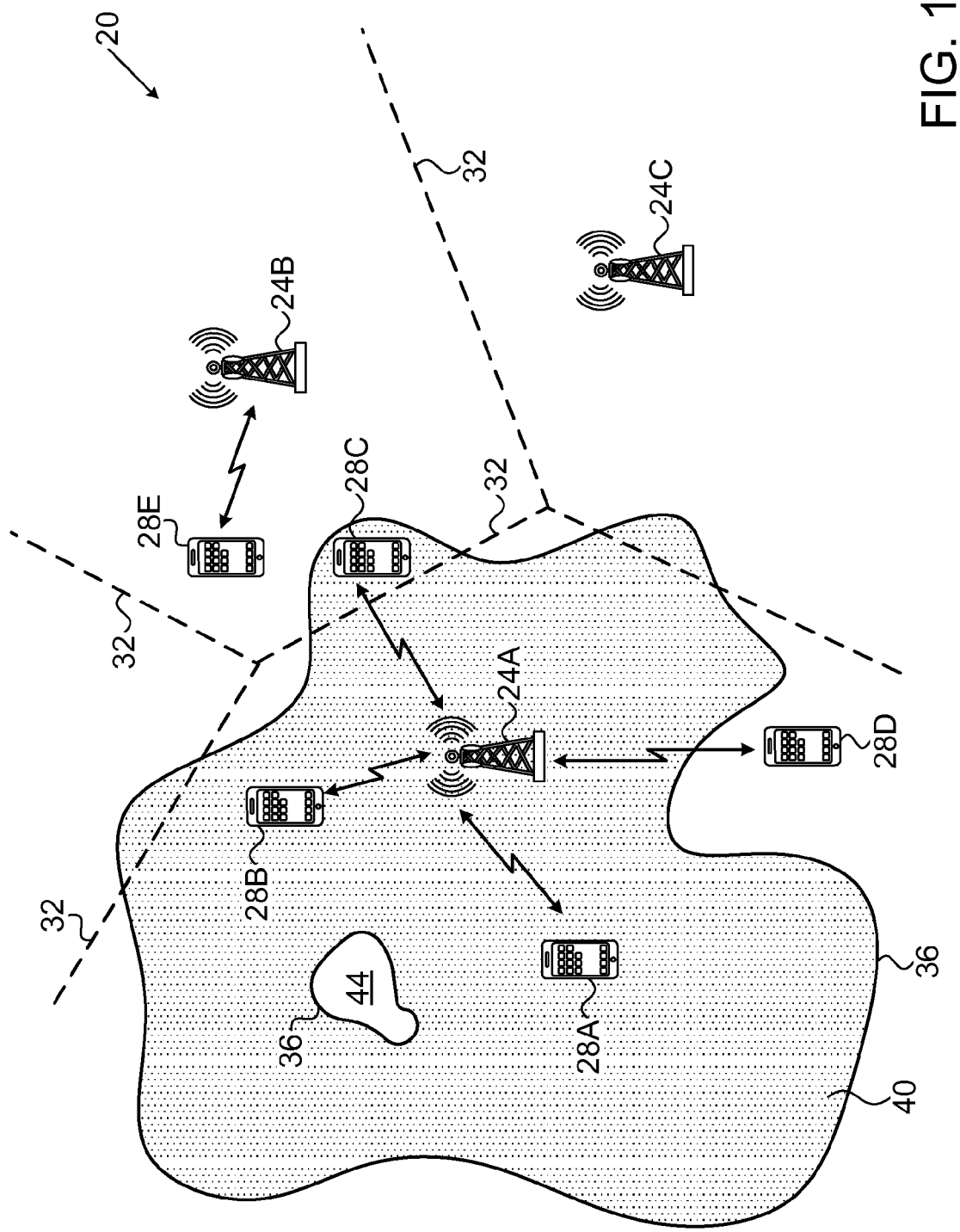
FIG. 1 is a diagram that schematically illustrates a cellular communication network, in accordance with an embodiment that is described herein.

Embodiments that are described herein provide methods and systems for mapping of cells in cellular communication networks. In some disclosed embodiments, a mapping system monitors traffic of multiple communication terminals (e.g., cellular phones), typically using passive monitoring. The system analyzes the monitored traffic so as to map the coverage and bandwidth usage of various cells with fine resolution.

In some embodiments, the system attempts to identify traffic in which a terminal reports its geographical position, e.g., GPS coordinates measured by its internal GPS receiver. The system correlates the reported geographical position with the cell identifier (CELL_ID) of the cell that currently serves the terminal. By crowd-sourcing a large number of [CELL_ID, GPS coordinates] data points, the system is able to map the actual geographical coverage area of each cell. The mapping accuracy depends on the accuracy of the GPS coordinates, typically on the order of several meters.

In some embodiments, the system measures the actual data bandwidth usage across the cell coverage area. For example, the system may analyze the traffic of terminals served by a given cell, identify the applications used by the terminals, and derive the actual data bandwidth usage as a function of geographical position. Bandwidth mapping of this sort can be repeated at various points in time, e.g., for different times of the day or week.

The above coverage and bandwidth usage mapping can be used, for example, by cellular service providers for various network management purposes. In an example embodiment, the service provider is able to allocate bandwidth resources to the cells in order to match the actual bandwidth usage requirements. The system may present the bandwidth mapping to the service provider, and/or perform the adaptive bandwidth allocation automatically. This solution is highly cost-effective, especially when the geographical distribution of bandwidth demand changes considerably over time.

Additionally or alternatively, the system may extract from the monitored traffic Network Measurement Reports (NMRs) in which the terminals report measured signal strength of neighbor cells. By correlating the extracted NMRs with the extracted GPS coordinates, for multiple terminals and over time, the system is able to map cell signal strengths with high resolution and accuracy. This mapping can be used, for example, for calibrating location tracking systems that are based on NMRs (sometimes referred to as "RF fingerprints").

The methods and systems described herein provide real-time mapping of coverage. This feature is particularly important, since in many cases the cell coverage area changes over time, e.g., depending on the number of users. Moreover, the disclosed techniques map the exact cell coverage without any need for running dedicated applications on the user terminals or any other cooperation of the users or the terminals. Furthermore, when using the disclosed techniques, the service provider becomes the owner of the cell coverage information, rather than having to rely on access to third-party application providers.

System Description

FIG. 1 is a diagram that schematically illustrates a cellular communication network 20, in accordance with an embodiment that is described herein. Network 20 may operate in accordance with any suitable cellular communication standard or protocol, such as, for example, Global System for Mobile Communications (GSM), Universal Mobile Telecommunications System (UMTS), Long-Term Evolution (LTE) or LTE-Advanced (LTE-A).

Network 20 comprises multiple base stations 24 that cover a certain geographical area. Each base station provides cellular communication services to mobile communication terminals 28 in one or more cells. The terms "cell" and "base station" are used interchangeably herein. Terminals 28 may comprise, for example, cellular phones, smart-phones, wireless-enabled computers, Personal Digital Assistants (PDAs), or any other suitable type of wireless communication terminal.

FIG. 1 shows three base stations 24A ... 24C and five terminals 28A ... 28E, for the sake of clarity. A real-life network typically comprises a large number of base stations and terminals. In the example of FIG. 1, the base stations are omni-directional and each base station supports a single cell, for the sake of clarity. Generally, however, a base station often supports multiple cells, e.g., three 120-degree sectors.

In FIG. 1, dashed lines 32 mark the theoretical or nominal coverage areas of the cells of network 20. The actual coverage area of a cell, i.e., the area in which the cell is able to provide cellular services with adequate quality, often differs from the nominal coverage area. The differences may be caused by various factors, such as channel propagation conditions and line-of-sight obstructions. In some embodiments, for example in Code-Division Multiple-Access (CDMA) based networks, the actual coverage area also depends on the cell capacity.

A solid line 36 marks an actual coverage area 40 of the cell served by base station 24A. The figure shows the actual coverage area of a single cell, for the sake of clarity. The other cells in the network also have actual coverage areas that possibly differ from the nominal coverage areas.

As can be seen in the figure, the actual coverage area defined by line 36 is different from the nominal or theoretical coverage area defined by lines 32. The differences may occur around the cell boundaries, and in some cases the actual coverage area may comprise one or more coverage holes 44. Terminal 28C, for example, is located outside the nominal coverage area but within the actual coverage area of base station 28C. Thus, terminal 28C should theoretically be served by base station 24B, but in practice may be served by base station 24A.

Information regarding the actual coverage areas of cells can be used for various purposes. For example, some applications locate and track communication terminals based on CELL_ID. When using the disclosed techniques, the location accuracy of such application can be improved.

Figure 2:
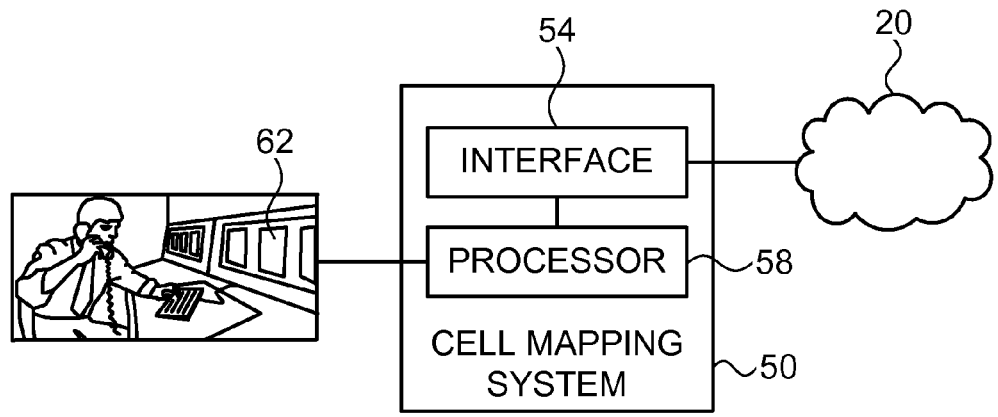
FIG. 2 is a block diagram that schematically illustrates a cell mapping system, in accordance with an embodiment that is described herein.

FIG. 2 is a block diagram that schematically illustrates a cell mapping system 50, in accordance with an embodiment that is described herein. System 50 monitors communication traffic that is exchanged in cellular network 20, and uses the monitored traffic to map the coverage and bandwidth usage of the various network cells.

In the present example, system 50 comprises a network interface 54 that is configured to connect to network 20 and monitor the communication traffic, and a processor 58 that is configured to carry out the methods described herein. System 50 is connected to an operator system 62, e.g., a management system of the service provider that operates network 20.

Interface 54 typically receives the desired network traffic passively, i.e., monitors traffic without transmitting, intervening, requesting traffic or otherwise affecting the network operation. Interface 54 may monitor any suitable element or interface in network 20, such as one or more interfaces between network elements of network 20 (e.g., Mobile Switching Centers—MSCs), or the air interface between terminals 28 and base stations 24.

In some embodiments, interface 54 monitors the traffic at multiple different points in network 20 simultaneously. In Universal Mobile Telecommunications System (UMTS) networks, for example, CELL_IDs, NMRs and other switching-related data may be monitored close to the cells, e.g., on IuB links between the base stations (e.g., UMTS NodeB) and the Radio Network Controller (RNC). GPS data may be obtained by monitoring application-layer information, e.g., between the Serving GPRS support node (SGSN) and the Gateway GPRS support node (GGSN). Processor 58 typically correlates the traffic obtained from the different interfaces of network 20, e.g., based on common identifiers of the terminals, such as International mobile Subscriber Identity (IMSI) or Mobile Station International Subscriber Directory Number (MSISDN).

The configuration of system 50 shown in FIG. 2 is an example configuration, which is chosen purely for the sake of conceptual clarity. In alternative embodiments, any other suitable system configuration can be used. Some elements of system 50 may be implemented in hardware, e.g., in one or more Application-Specific Integrated Circuits (ASICs) or Field-Programmable Gate Arrays (FPGAs). Additionally or alternatively, some elements of system 50 can be implemented using software, or using a combination of hardware and software elements.

Typically, processor 58 comprises one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Fine-Resolution Mapping of Cell Coverage and Data Bandwidth Usage

As shown in FIG. 1 above, the actual coverage area of a cell often differs from the nominal or theoretical coverage area. System 50 uses passive crowd-sourcing techniques to map the actual coverage areas of cells with fine resolution.

Figure 3:
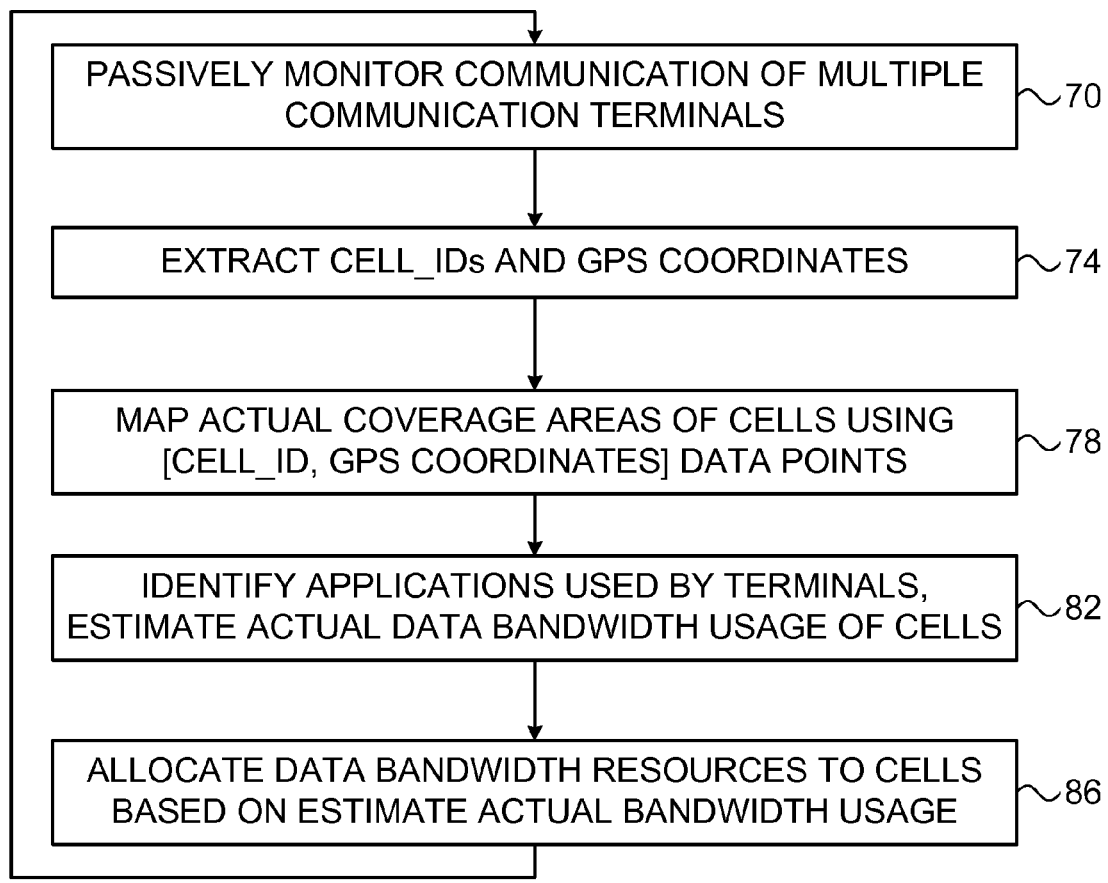
FIG. 3 is a flow chart that schematically illustrates a method for cell mapping, in accordance with an embodiment that is described herein.

FIG. 3 is a flow chart that schematically illustrates a method for cell mapping, in accordance with an embodiment that is described herein. The method begins with interface 54 of system 50 monitoring the communication of multiple communication terminals in network 20, at a monitoring step 70. As explained above, interface 54 may monitor the wired communication between network-side nodes of network 20 and/or the over-the-air transmissions.

Processor 58 extracts from the monitored traffic CELL_IDs and corresponding GPS coordinates, at an extraction step 74. Typically, processor 58 analyzes the communication traffic received from network 20, and attempts to identify application-layer information that comprise GPS coordinates. Processor 58 may identify such information, for example, by detecting strings such as "LAT" and "LONG" that precede such coordinates, by identifying the underlying application and decoding its known protocol, or using any other suitable method. Example techniques that can be used for extracting GPS information from monitored traffic are described in U.S. patent application Ser. No. 13/550,859, entitled "System and method for location of wireless communication terminals using application-level location data," filed Jul. 17, 2012, which is assigned to the assignee of the present patent application and whose disclosure is incorporated herein by reference.

Although the embodiments described herein refer mainly to GPS coordinates, the disclosed techniques can be used with other suitable types of location coordinates or measurements that the terminal reports to the network. For example, in some scenarios (e.g., inside buildings or otherwise when GPS data is not available) a terminal may measure and report its location based on Wi-Fi Access Points (AP) that were mapped in advanced. Wi-Fi based location information is also typically reported by the terminals as LAT/LONG data. System 50 may obtain and use this type of location information, additionally or alternatively to GPS information.

Upon finding a message that carries GPS coordinates, processor 58 extracts the CELL_ID from this message, i.e., the CELL_ID of the cell that served the terminal when the terminal reported the GPS coordinates. The output of step 74 is a collection of data points, each data point comprising a pair of [CELL_ID, GPS coordinates]. The set of data points relating to a given CELL_ID gives a fine-resolution mapping of the actual cell coverage area. Processor 58 maps the actual coverage area of at least one of the cells using the accumulated data points, at a coverage mapping step 78. The mapping can be output in any suitable way, e.g., provided to operator system 62. (In some embodiments, processor 58 extracts Network Measurement Reports (NMRs) from the monitored traffic, in addition to GPS coordinates and CELL_ID. Example techniques that correlate NMR and GPS information are addressed further below.)

In some embodiments, processor 58 also maps the actual data bandwidth usage as a function of geography, at a bandwidth usage mapping step 82. In an example embodiment, processor 58 identifies the data applications used by the terminals whose GPS coordinates were extracted at step 74 above. By correlating the GPS coordinates with the applications used at these coordinates, processor 58 is able to estimate the actual usage of data bandwidth per geographical position.

The geographical resolution of this estimation is considerably finer than cell resolution. In other words, processor 58 is able to estimate actual bandwidth usage as a function of geographical position for multiple locations within the coverage area of a given cell.

The bandwidth usage mapping can be used for various purposes. In an example embodiment, system 50 allocates bandwidth resources to the various cells depending on the actual bandwidth usage, at an allocation step 86.

It should be noted that the mapping process above considers only a subset of the terminals in network 20—The terminals that measure and report GPS coordinates. The underlying assumption is that the geographical distribution of these terminals is similar to the general geographical distribution of all terminals. It is also implicitly assumed that the bandwidth usage of the GPS-enable terminals is similar to that of the other terminals.

In many practical scenarios, the actual bandwidth usage distribution and/or the actual coverage area changes over time, e.g., as a function of the time of day or day of the week. For example, in the mornings and evenings of weekdays, bandwidth usage tends to concentrate around highways. In the middle of the day, on the other hand, bandwidth usage tends to concentrate in industrial areas. In evenings and weekends, bandwidth usage tends to concentrate in residential and recreational areas. Cell coverage may change, for example, as a function of the number of served users, or as a result of changes performed by the service provider.

Therefore, in some embodiments the process of FIG. 3 is repeated or updated over time, e.g., at different times of the day and/or different days of the week. Such dynamic information provides a powerful tool for service provider, in real-time or nearly in real-time. Using this information the service provider is able to allocate bandwidth resources to cells adaptively, so as to match the actual bandwidth demand. As a result, network resources can be used with high efficiency.

In some embodiments, processor 58 may also extract Network Measurement Reports (NMRs) from the monitored traffic, and correlate the NMRs with the GPS coordinates extracted from the traffic. Each NMR reports the signal strengths of one or more neighbor base station, as measured by the terminal. Correlation of NMRs with GPS coordinates, for multiple terminals and over time, provides a fine-resolution model that maps base station signal strength as a function of position. Like the coverage and bandwidth mapping, the signal-strength mapping is also obtained passively in a crowd-sourced manner. Techniques of this sort are addressed, for example, in U.S. patent application Ser. No. 13/011,871, entitled "System and method for mass calibration of radio frequency fingerprint (RF-FP) location measurements," filed Jan. 22, 2011, which is assigned to the assignee of the present patent application and whose disclosure is incorporated herein by reference.

The signal-strength mapping model can be used for various purposes, such as for quality-of-service measurement (e.g., replacing dedicated drive-tests), or for calibrating location tracking systems that are based on NMRs (sometimes referred to as "RF fingerprints").

The methods and systems described herein can generally be used in a wide variety of applications, such as network planning, network optimization, location-based services, emergency services, and many others.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    passively monitoring communication of multiple communication terminals that communicate in a cellular communication network;
    extracting from the monitored communication multiple data points, which comprise geographical positions that are measured and reported by the communication terminals while served by respective cells of the cellular communication network, and corresponding cell identifiers of the cells;
    mapping an actual geographical coverage of at least a given cell of the cellular communication network based on the multiple data points, wherein the geographical positions comprise coordinates measured in the communication terminals, wherein extracting the data points comprises extracting the coordinates from application-layer information exchanged in the monitored communication, wherein extracting the data points further comprises assessing data bandwidth usage of the communication terminals, and wherein mapping the actual geographical coverage comprises mapping an actual data bandwidth usage for the given cell over the actual geographical coverage; and
    adaptively allocating bandwidth resources to the given cell based on the actual bandwidth usage.

2. The method according to claim 1, wherein passively monitoring the communication comprises receiving the communication without affecting operation of the cellular communication network.

3. The method according to claim 1, wherein monitoring the communication comprises extracting portions of the communication from multiple different interfaces of the cellular communication network, and correlating the portions of the communication using one or more common identifiers that identify the communication terminals.

4. The method according to claim 1, wherein mapping the actual geographical coverage comprises estimating the actual geographical coverage for at least first and second different points in time.

5. The method according to claim 1, wherein mapping the actual data bandwidth usage comprises identifying data applications used by the communication terminals.

6. The method according to claim 1, wherein mapping the actual data bandwidth usage comprises estimating the actual bandwidth usage for at least first and second different points in time.

7. The method according to claim 1, wherein extracting the data points further comprises extracting from the monitored traffic Network Measurement Reports (NMRs) in which the communication terminals report received signal strengths of one or more base stations of the cellular network, and wherein mapping the actual geographical coverage comprises correlating the extracted NMRs with the extracted geographical positions.

8. The method according to claim 7, wherein correlating the NMRs with the geographical positions comprises generating a model that maps the received signal strengths as a function of location coordinates.

9. The method according to claim 8, and comprising assessing a quality-of-service of the cellular communication network based on the model.

10. The method according to claim 8, and comprising tracking one or more of the terminals based on the model.

11. A system, comprising:
    an interface, which is configured to passively monitor communication of multiple communication terminals that communicate in a cellular communication network; and
    a processor, which is configured to extract from the monitored communication multiple data points, which comprise geographical positions that are measured and reported by the communication terminals while served by respective cells of the cellular communication network, and corresponding cell identifiers of the cells, and to map an actual geographical coverage of at least a given cell of the cellular communication network based on the multiple data points;
    wherein the geographical positions comprise coordinates measured in the communication terminals, wherein the processor is configured to extract the coordinates from application-layer information exchanged in the monitored communication, wherein the processor is further configured to assess data bandwidth usage of the communication terminals, and to map an actual data bandwidth usage for the given cell over the actual geographical coverage, wherein the processor is further configured to adaptively allocate bandwidth resources to the given cell based on the actual bandwidth usage.

12. The system according to claim 11, wherein the interface is configured to passively receive the monitored communication without affecting operation of the cellular communication network.

13. The system according to claim 11, wherein the interface is configured to monitor portions of the communication on multiple different interfaces of the cellular communication network, and wherein the processor is configured to correlate the portions of the communication using one or more common identifiers that identify the communication terminals.

14. The system according to claim 11, wherein the processor is configured to estimate the actual geographical coverage for at least first and second different points in time.

15. The system according to claim 11, wherein the processor is configured to map the actual data bandwidth usage by identifying data applications used by the communication terminals.

16. The system according to claim 11, wherein the processor is configured to estimate the actual bandwidth usage for at least first and second different points in time.

17. The system according to claim 11, wherein the processor is configured to extract from the monitored traffic Network Measurement Reports (NMRs) in which the communication terminals report received signal strengths of one or more base stations of the cellular network, and to map the actual geographical coverage by correlating the extracted NMRs with the extracted geographical positions.

18. The system according to claim 17, wherein, by correlating the NMRs with the geographical positions, the processor is configured to generate a model that maps the received signal strengths as a function of location coordinates.

19. The system according to claim 18, wherein the processor is configured to assess a quality-of-service of the cellular communication network based on the model.

20. The system according to claim 18, wherein the processor is configured to track one or more of the terminals based on the model.

* * * * *